O. H. ARNER.
STEAM TRAP.
APPLICATION FILED AUG. 16, 1910.
1,006,043.
Patented Oct. 17, 1911.
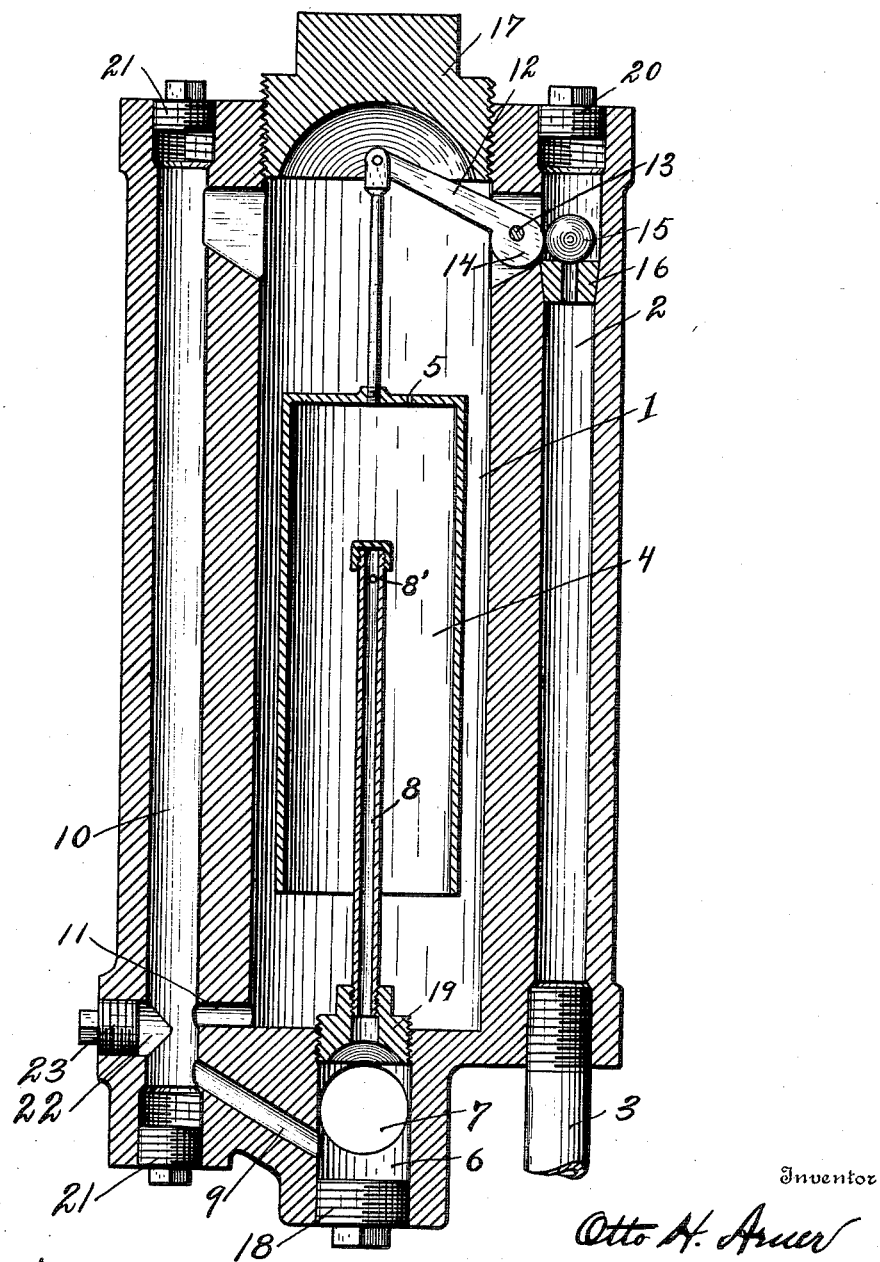
Witnesses
Inventor
Otto H. Arner
By Chappell V. Earl
Attorneys

UNITED STATES PATENT OFFICE.

OTTO H. ARNER, OF THREE RIVERS, MICHIGAN, ASSIGNOR OF ONE-FOURTH TO ADAM E. ARMSTRONG AND ONE-FOURTH TO WILLIAM H. TIMM, BOTH OF THREE RIVERS, MICHIGAN.

STEAM-TRAP.

1,006,043.  Specification of Letters Patent.  Patented Oct. 17, 1911.

Application filed August 16, 1910. Serial No. 577,483.

*To all whom it may concern:*

Be it known that I, OTTO H. ARNER, a citizen of the United States, residing at Three Rivers, Michigan, have invented certain new and useful Improvements in Steam-Traps, of which the following is a specification.

This invention relates to improvements in steam traps.

The main objects of this invention are: First, to provide an improved steam trap in which the discharge valve is fully opened when actuated so that the under-cutting of the valve seat is effectively prevented. Second, to provide an improved steam trap which is compact in structure and comparatively light in weight and capable of caring for a comparatively large volume of water. Third, to provide an improved steam trap which is very efficient and durable and not likely to get out of repair in use, or become air bound. Fourth, to provide an improved steam trap which is very economical in structure and one which operates under a great variety of conditions.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which the figure is a vertical central section.

Referring to the drawing, my improved steam trap comprises a float chamber 1 which is cylindrical in form and disposed vertically in the trap body, as illustrated. This float chamber is provided with a discharge passage 2 opening at its upper end. A pipe 3 is connected to this discharge passage to carry away the water discharged. Within the float chamber I arrange the float 4 which is open at its lower end and provided with a restricted vent opening 5 in its upper end. Below the float chamber is an inlet chamber 6 which is connected through the inlet opening 7 to the system or object to be drained. A steam delivery pipe 8 opening at the upper end of the inlet chamber 6 projects into the float to deliver thereto. The upper end of this pipe 8 has lateral discharge aperture 8' only, to prevent impact of steam raising float without buoyancy. A water discharge passage for the inlet chamber formed of the passages 9 and 10 connects the inlet chamber 6 with the upper end of the float chamber. The portion 10 of the discharge passage is connected to the lower end of the float chamber by the by-pass 11. The float 4 is submerged, the water discharge for the float chamber being above the upper end of the float when it is in its raised position. The float is connected to a lever 12, which is pivoted at 13 and provided with a cam 14 adapted to act on the ball discharge valve 15 when the float falls, raising the valve from its seat 16. It will be noted that the cam 14 is shaped so that the greatest leverage is secured on the initial movement of the lever 12. This is as it should be, as the greatest power is required for unseating the valve and thus releasing the pressure within the trap. The float chamber is so proportioned that the trap has a relatively long movement and this is utilized to secure the leverage. The float is, in practice, made light and is very sensitive.

The steam discharge for the inlet chamber 6 is arranged above the water discharge passage so that the water and steam are separated in this chamber, the steam passing into the float while the water passes into the float chamber outside of the float.

In operation, when steam or air passes into the trap, the float is raised, thereby permitting the valve to close. When the steam condenses or escapes, or the air escapes, the float being already submerged, sinks entirely to the bottom of the chamber. This comparatively long travel of the float insures a complete opening of the discharge valve so that the water is freely discharged and the valve seat is not worn away as is likely to occur where the valve opens but partially, thus opening the valve and any surplus water is discharged, the valve remaining open until the steam or air again lifts the float. It is found in practice that the float is actuated with a considerable regularity and water is effectively discharged with very little loss of steam. When the float drops, it being submerged, it drops very quickly, opening the discharge valve fully so that the valve seat is not cut or worn away, and also the escape of steam after the surplus water has passed out is prevented. The valve is also closed quickly thus preventing the escape of steam after the surplus water has been discharged. As stated, when the float begins to fall, it being already submerged, it falls entirely to the bottom of the float chamber. This comparatively long travel of the float is utilized, through the lever connection, to secure great power for opening the discharge valve. This makes it practical to use floats of light weight, which makes the trap very compact and economical and light in weight as a whole.

I form the chambers and passages in a single casting, which renders the structure not only simple and compact, but economical. The float chamber 1 is open at the upper end of the casting or body and closed by a threaded plug 17. The inlet chamber opens into the float chamber and at the lower end of the body, the lower end being closed by the plug 18 and the upper end by the plug 19 by which the pipe 8 is carried. The upper end of the discharge passage 2 is closed by the plug 20, while the lower end receives the pipe 3. The portion 10 of the discharge passage of the inlet chamber is closed at its ends by the plugs 21. An opening 22 is provided for boring out the by-pass 11 and the portion 9 of the inlet chamber discharge. This opening is closed by the plug 23. The structure is, as will be obvious, very economically produced and it has a large capacity in proportion to its size.

I have illustrated and described my improved steam trap in the form in which I have embodied the same in practice. I am aware that it can be considerably varied in structural details without departing from my invention, but as these details will no doubt be obvious to those skilled in the art to which this invention relates, I have not attempted to illustrate or describe the same herein.

Having thus described my invention, what I claim as new and desire to secure by Letters Patent is:

1. In a steam trap, the combination with the float chamber having a discharge at its upper end; a discharge valve; a submerged float open at its lower end and having a restricted vent opening at its upper end connected to said valve to open the same on the falling of the float; an inlet chamber; a steam discharge pipe for said inlet chamber projecting into said float; and a water discharge passage for said inlet chamber opening into said inlet chamber below the said steam discharge pipe and delivering to said float chamber at the upper end thereof, said passage being provided with a by-pass connection with the lower end of said float chamber.

2. In a steam trap, the combination with the float chamber having a discharge at its upper end; a discharge valve; a submerged float open at its lower end and having a restricted vent opening at its upper end connected to said valve to open the same on the falling of the float; an inlet chamber; a steam discharge pipe for said inlet chamber projecting into said float; and a water discharge passage for said inlet chamber opening into said inlet chamber below the said steam discharge pipe and delivering to said float chamber at the upper end thereof.

3. In a steam trap, the combination with the float chamber having a discharge at its upper end; a discharge valve; a submerged float open at its lower end, connected to said valve to open the same on the falling of the float; an inlet chamber; a steam discharge pipe for said inlet chamber projecting into said float; and a water discharge passage for said inlet chamber opening into said inlet chamber below the said steam discharge pipe and delivering to said float chamber at the upper end thereof, said passage being provided with a by-pass connection with the lower end of said float chamber.

4. In a steam trap, the combination with the float chamber having a discharge at its upper end; a discharge valve; a submerged float open at its lower end, connected to said valve to open the same on the falling of the float; an inlet chamber; a steam discharge pipe for said inlet chamber projecting into said float; and a water discharge passage for said inlet chamber opening into said inlet chamber below the said steam discharge pipe and delivering to said float chamber at the upper end thereof.

5. In a steam trap, the combination with the float chamber, of a submerged float open at its lower end; a discharge valve adapted to be operated by the falling of the float, the discharge of said chamber being above the upper end of said float when the float is in its elevated position; and a water discharge by-pass passage delivering into said float chamber above the float when the float is in its raised position.

6. In a steam trap, the combination with a float chamber having a discharge at its upper end; a submerged float open at its lower end; connections for delivering steam to said float and water to said float chamber independently of said steam delivery connections; and a discharge valve for said float chamber adapted to be opened by the falling of said float.

7. In a steam trap, the combination with the float chamber, of a submerged float open at its lower end, said chamber being of such depth as to permit a relatively long movement of the float; a discharge for said float chamber; a valve for said discharge; and a valve lever connected to said float to open the valve on the falling movement of the float, the lever being adapted to exert its greatest power on the valve for unseating the same at the beginning of the falling movement of the float.

8. In a steam trap, the combination with the float chamber, of a submerged float open at its lower end; a discharge valve, the discharge of said chamber being above the upper end of said float when the float is in its elevated position; a valve actuating lever connected to said float to open the valve on the falling of the float; and a water discharge passage delivering into said float chamber above the float when it is in its raised position.

9. In a steam trap, the combination with the float chamber, of a submerged float open at its lower end, the chamber being of such depth as to permit a relatively long movement of the float; a discharge valve, the discharge of the chamber being above the upper end of said float when the float is in its raised position; and a valve actuated lever connected to said float to open the valve on the falling of the float, the float being connected to the long end of the lever whereby the long movement of the float is utilized for the purpose specified.

10. In a steam trap, the combination with the float chamber, of a float actuated discharge valve for said float chamber; a submerged float open at its lower end arranged in said chamber, said float being provided with an open vent in its upper end; inlet connections whereby steam is delivered into said float and water is delivered into said float chamber; and a lever for actuating said valve connected to said float, the connection being arranged to open the valve on the downward movement of the float.

11. A steam trap comprising a central float chamber, an inlet chamber formed in the bottom of said float chamber, a water discharge passage for said inlet chamber formed in the wall of the float chamber, and delivering into the upper end thereof; a by-pass passage connecting said inlet chamber discharge passage with the bottom of said float chamber; and a discharge passage for said float chamber formed in the wall of said float chamber and connected with the upper end thereof.

12. A steam trap comprising a central float chamber, an inlet chamber formed in the bottom of said float chamber, a water discharge passage for said inlet chamber formed in the wall of the float chamber, and delivering into the upper end thereof, and a discharge passage for said float chamber formed in the wall of said float chamber and connected with the upper end thereof.

13. In a steam trap, the combination with the float chamber, of a float; a ball discharge valve for said float chamber; and a cam lever connected to said float and arranged to engage said valve.

14. A steam trap comprising a central float chamber, an inlet chamber formed in the bottom of said float chamber, a water discharge passage for said inlet chamber formed in the wall of the float chamber and delivering into the upper end thereof; and a by-pass passage connecting said inlet chamber discharge passage with the bottom of said float chamber.

In witness whereof, I have hereunto set my hand and seal in the presence of two witnesses.

OTTO H. ARNER. [L. S.]

Witnesses:
   L. G. Greenfield,
   F. Gertrude Tallman.